United States Patent [19]

Bianchini et al.

[11] Patent Number: 5,604,042
[45] Date of Patent: Feb. 18, 1997

[54] CELLULOSE MATERIAL CONTAINING BARRIER FILM STRUCTURES

[75] Inventors: Eber C. Bianchini, Rochester, N.Y.; Anthony R. Knoerzer, Plano, Tex.; Larry A. Parr, Canandaigua; Leland W. Reid, Palmyra, both of N.Y.

[73] Assignee: Mobil Oil Corporation, Fairfax, Va.

[21] Appl. No.: 574,981

[22] Filed: Dec. 19, 1995

Related U.S. Application Data

[63] Continuation of Ser. No. 272,056, Jul. 8, 1994, abandoned, which is a continuation-in-part of Ser. No. 80,602, Jun. 24, 1993, Pat. No. 5,380,586, which is a continuation-in-part of Ser. No. 812,493, Dec. 23, 1991, abandoned.

[51] Int. Cl.$^6$ .................. B32B 27/00; B32B 27/16; B32B 27/26
[52] U.S. Cl. .................. 428/507; 428/34.3; 428/35.4; 428/36.6; 428/36.7; 428/511; 428/513; 428/514; 428/913
[58] Field of Search .................. 428/34.3, 35.4, 428/36.6, 36.7, 507, 511, 513, 514, 913

[56] References Cited

U.S. PATENT DOCUMENTS

| | | | |
|---|---|---|---|
| 2,130,212 | 9/1938 | Watkins | 260/2 |
| 2,333,796 | 11/1943 | Kenyon | 260/73 |
| 2,362,026 | 12/1944 | Quist . | |
| 2,419,281 | 4/1947 | Noble | 260/90 |
| 2,897,092 | 7/1959 | Miller | 117/47 |
| 2,916,468 | 12/1959 | Yundt | 260/29.6 |
| 3,033,842 | 5/1962 | Holtschmidt | 260/91.3 |
| 3,099,646 | 7/1963 | Scardiglia et al. | 290/91.3 |
| 3,221,079 | 11/1965 | Harria | 260/844 |
| 3,232,916 | 2/1966 | Fogle | 260/91.3 |
| 3,275,575 | 9/1966 | Fogle | 260/2.2 |
| 3,282,729 | 11/1966 | Richardson et al. | 428/506 |
| 3,294,577 | 12/1966 | Mayer | 117/138.8 |
| 3,518,242 | 6/1970 | Chrisp | 260/91.3 |
| 3,702,844 | 11/1972 | Ofstead | 260/91.3 |
| 3,719,621 | 3/1973 | Vogt et al. | 260/30.4 |
| 3,719,629 | 3/1973 | Martin et al. | 260/33.2 |
| 4,055,698 | 10/1977 | Beery | 428/516 X |
| 4,058,645 | 11/1977 | Steiner | 428/520 X |
| 4,154,912 | 5/1979 | Philipp et al. | 526/7 |
| 4,214,039 | 7/1980 | Steiner et al. | 428/414 |
| 4,224,262 | 9/1980 | Baird, Jr. et al. | 264/22 |
| 4,235,365 | 11/1980 | Yoshii et al. | 229/55 |
| 4,240,993 | 12/1980 | Sun | 264/22 |
| 4,254,169 | 3/1981 | Schroeder | 428/35 |
| 4,254,170 | 3/1981 | Roullet et al. | 428/522 X |
| 4,262,067 | 4/1981 | Philipp et al. | 264/104 X |
| 4,272,470 | 6/1981 | Hsu et al. | 264/104 |
| 4,275,119 | 6/1981 | Weiner | 428/516 |
| 4,276,330 | 6/1981 | Stanley et al. | 428/332 X |
| 4,277,572 | 7/1981 | Fujiwara et al. | 525/61 |
| 4,284,671 | 8/1981 | Cancio et al. | 428/35 |
| 4,288,477 | 9/1981 | Bordini et al. | 428/35 |

(List continued on next page.)

FOREIGN PATENT DOCUMENTS

0254468A2  1/1988  European Pat. Off. .

OTHER PUBLICATIONS

T. W. Modi, *Polyvinyl Alcohol*, in Handbook of Water–Soluble Gums and Resins 20.1–20.32 (Robert L. Davidson ed., 1980).

Harold L. Jaffe and Franklin M. Rosenblum, *Poly(Vinyl Alcohol) for Adhesives*, in Handbook of Adhesives 401–407 (Irving Skeist ec., 1990).

*Primary Examiner*—Kathleen Choi
*Attorney, Agent, or Firm*—Dennis P. Santini

[57] ABSTRACT

A polymeric film structure having improved oxygen, flavor/odor, grease/oil and moisture barrier characteristics is disclosed. The structure includes a polymeric substrate adapted to receive an oxygen barrier on one side thereof and a moisture barrier on the other side of the oxygen barrier. The oxygen barrier includes polyvinyl alcohol cross-linked with aldehyde containing cross-linking agents in the presence of a catalytic amount of sulfuric acid. The moisture barrier can be provided by the carrier web or incorporated into the cellulosic material, which is preferably box board.

20 Claims, 1 Drawing Sheet

U.S. PATENT DOCUMENTS

| | | | |
|---|---|---|---|
| 4,357,402 | 11/1982 | Sheibley et al. | 429/206 |
| 4,363,840 | 12/1982 | Roullet et al. | 428/516 X |
| 4,376,183 | 3/1983 | Haskell | 524/417 |
| 4,416,938 | 11/1983 | Haskell | 428/483 X |
| 4,418,119 | 11/1983 | Morrow et al. | 428/342 |
| 4,439,493 | 3/1984 | Hein et al. | 428/414 |
| 4,475,241 | 10/1984 | Mueller et al. | 428/412 X |
| 4,564,559 | 1/1986 | Wagner et al. | 423/349 |
| 4,565,742 | 1/1986 | Lang | 428/476.3 |
| 4,650,721 | 3/1987 | Ashcraft et al. | 428/516 |
| 4,719,147 | 1/1988 | Mauri | 428/336 |
| 4,725,646 | 2/1988 | Kobashi et al. | 525/61 |
| 4,731,266 | 3/1988 | Bonnebat et al. | 428/518 X |
| 4,770,944 | 9/1988 | Farrell et al. | 428/474.4 |
| 4,785,049 | 11/1988 | Balaba et al. | 525/61 |
| 4,816,342 | 3/1989 | Farrell et al. | 428/475.5 |
| 4,883,698 | 11/1989 | Bothe et al. | 428/35.9 |
| 4,894,267 | 1/1990 | Bettle, III et al. | 428/34.3 X |
| 4,927,689 | 5/1990 | Markiewicz | 428/34.8 |
| 4,975,315 | 12/1990 | Bothe et al. | 428/216 |
| 5,102,699 | 4/1992 | Beeson et al. | 428/483 X |
| 5,133,999 | 7/1992 | Löfgren et al. | 428/36.7 X |
| 5,175,036 | 12/1992 | Smiley et al. | 428/36.7 |
| 5,178,960 | 1/1993 | Cook | 428/461 |
| 5,196,269 | 3/1993 | Kittrell et al. | 428/513 |
| 5,225,288 | 7/1993 | Beeson | 428/475.5 |
| 5,230,963 | 7/1993 | Knoerzer | 428/520 |
| 5,252,384 | 10/1993 | Bothe et al. | 428/212 |
| 5,254,394 | 10/1993 | Bothe et al. | 428/212 |
| 5,286,424 | 2/1994 | Su et al. | 264/23 |
| 5,330,831 | 7/1994 | Knoerzer et al. | 428/36.7 X |
| 5,355,636 | 10/1994 | Harmon | 51/295 |
| 5,512,338 | 4/1996 | Bianchini et al. | 428/35.4 |

CELLULOSE MATERIAL CONTAINING BARRIER FILM STRUCTURES

CROSS-REFERENCE TO RELATED APPLICATIONS

This application is a continuation of application(s) Ser. No. 08/272,056 filed on Jul. 8, 1994, now abandoned which is a continuation-in-part of commonly assigned U.S. application Ser. No. 08/080,602, filed Jun. 24, 1993 now U.S. Pat. No. 5,380,586 which is a continuation-in-part of U.S. application Ser. No. 07/812,493 filed Dec. 23, 1991 now abandoned.

BACKGROUND OF THE INVENTION

The present invention relates to flexible polymeric film packaging structures with improved oxygen, flavor/odor, grease/oil and moisture barrier characteristics. More specifically, the invention relates to a film structure which includes a polymeric substrate, an oxygen barrier containing cross-linked polyvinyl alcohol ("PVOH") and a moisture barrier including a cellulose material.

Certain polymeric films employed for the packaging of foods inherently permit the transmission of oxygen and moisture from the outside of the film to the inside of a food package wrapped with the film. Oxygen and/or moisture permit rapid deterioration of foods packaged in polymeric films. Exclusion of oxygen and moisture from packaged foods retards product spoilage. In certain applications, such as packaging of detergents, cleaners, fertilizers and the like, it is important that the packaging material prevents the odors from spreading outside. In other applications, such as juices, wines, pretzels and biscuits it is sought to protect the contents against acquisition of undesirable flavors from the outside. Therefore, film structures which provide a barrier to oxygen, flavor/odor, grease/oil and moisture are highly desirable food packaging materials.

Attempts have been made in the past to provide polymeric films which have high oxygen, flavor/odor, grease/oil and moisture barrier. Some polymeric films disclosed in the prior art include PVOH. Polyvinyl alcohols are polymers containing ($—CH_2—CHOH—$) groups. They can be applied from water solution and are in many respects attractive materials for use as barrier coatings for thermoplastic polymer substrates. When applied to thermoplastic polymer surfaces which have been treated by any of a number of means to render them receptive to coatings, polyvinyl alcohols adhere adequately, are flexible, clear and transparent, provide an oxygen impermeable barrier, and are resistant to permeation by greases, oils and a wide variety of common organic solvents, such as esters, ethers, ketones, hydrocarbons and chlorinated hydrocarbons.

The advantage of water solubility in the application of PVOH as a barrier coating becomes its chief drawback, however, when the barrier coating has been formed on a thermoplastic polymer substrate. The poor water resistance of PVOH restricts its use as a barrier coating to those few applications where nearly anhydrous conditions prevail. Moisture may act to cause staining or wear due to friction, an unpleasant feel to the touch and a dull appearance. It is also known that oxygen permeability of PVOH increases in proportion to its moisture content.

A number of methods have been known for increasing the water resistance of PVOH, but none provides entirely satisfactory results. In spite of various heretofore practiced methods, the polyvinyl alcohol still tends to soften, swell and lose adhering strength when exposed to water or even moisture vapor. Hence, barrier coatings consisting only of polyvinyl alcohol cannot be used where a substantial degree of water-resistance or moisture-proofness is required.

Accordingly, there is still a need in the art of packaging films to provide a film structure which has excellent oxygen, flavor/odor, grease/oil and moisture barrier characteristics.

It is, therefore, an object of the present invention to provide a new packaging film structure which includes cross-linked PVOH and exhibits excellent oxygen, flavor/odor, grease/oil and moisture barrier characteristics.

SUMMARY OF THE INVENTION

The present invention, which addresses the needs of the prior art, provides packaging film structures which have both low oxygen and high moisture barrier properties.

More specifically, it has now been found that by securing a film combination which has low oxygen transmissive properties to a moisture barrier including cellulose material, preferably box board, film structures having enhanced oxygen, flavor/odor, grease/oil and high moisture barrier are obtained.

The film structure having improved oxygen and moisture barrier characteristics includes a polymeric substrate adapted to receive an oxygen barrier layer by surface treating and priming of at least one side thereof. Once treated and primed, the surface of the polymeric substrate is provided with an oxygen barrier layer which includes PVOH cross-linked with a cross-linking agent in the presence of a catalytic amount of sulfuric acid. A cellulose material is then laminated by adhesion onto the outer surface of the oxygen barrier of the film structure. The adhesive is preferably polyurethane or polyethylene. The cellulose material is preferably paperboard or fiberboard, and most preferably box board.

In all packaging film structures of the present invention the polymeric substrate may be oriented polyethylene terephthalate, nylon, polypropylene and polyethylene. The polymeric substrate is usually surface treated by known processes, preferably corona treatment, to a surface free energy of 35 dynes/cm.

The present invention also provides a process of preparing packaging film structures having improved oxygen and moisture barrier properties. The process includes coating at least one surface of a primed, surface treated polymeric substrate with an aqueous solution of PVOH, aldehyde-containing crosslinking agent and a catalytic amount of sulfuric acid and allowing the polyvinyl alcohol to cross-link thus forming an oxygen barrier. The aqueous solution of PVOH includes a solid content comprising from about 62.5% to about 95% by weight of PVOH, from about 5% to about 30% by weight of crosslinking agent and up to 7.5% by weight of acid catalyst. The cellulose material layer which provides the moisture barrier is then secured to an outer surface of the oxygen barrier by adhesion lamination. Packaging film structures made by the processes described above are also encompassed by the present invention.

As a result of the present invention, packaging film structures are provided which have excellent oxygen and moisture barrier properties. The film structures of the present invention have been found to be especially useful in a packaging of tomato sauces, condiments, wines, juices and detergents, in which it is important that the flavor or odor of the foodstuffs is contained within the package. These film structures are also useful in packaging of milk, creams and the like in which preventing the acquisition of outside odors is important to preserving the freshness of the products. In addition, the layer of cross-linked PVOH coating used in the present invention may be used at thinner gauges than other oxygen barrier layers. For example, less than 0.05 mils of cross-linked PVOH provides an oxygen barrier which is as effective as 0.48 mils of EVOH coating. Thus, by using the packaging film structures of the present invention, significant manufacturing cost savings can be realized.

Other improvements which the present invention provides over the prior art will be identified as a result of the following description which sets forth the preferred embodiments of the present invention. The description is not in any way intended to limit the scope of the present invention, but rather only to provide a working example of the present preferred embodiments. The scope of the present invention will be pointed out in the appended claims.

DETAILED DESCRIPTION OF THE INVENTION

Figure 1:
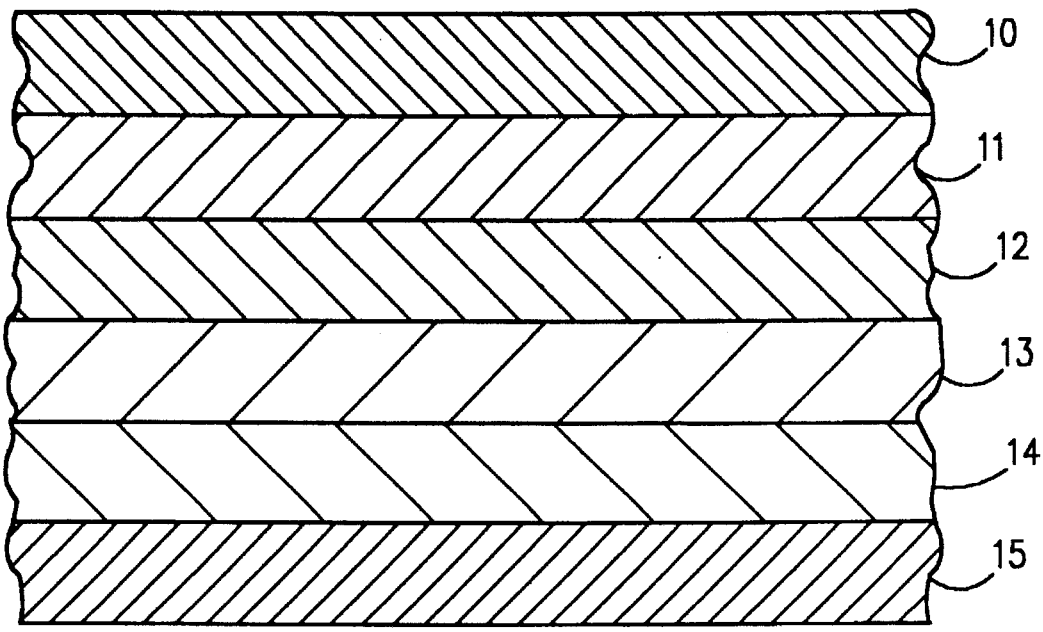
FIG. 1 shows a cross-sectional view of one embodiment of the present invention, wherein the foodstuff is next to the sealant coated cellulose material.

Certain barrier film combinations have excellent oxygen barrier properties. However, for certain commercial applications the moisture barrier properties of these films can be improved. U.S. application Ser. No. 08/080,602 filed Jun. 24, 1993, incorporated herein by reference, (the "parent application"), discloses excellent oxygen barrier film combinations having at least one layer of PVOH crosslinked with a crosslinking agent in the presence of a catalytic amount of sulfuric acid.

Although the resulting film combination of the parent application has excellent oxygen barrier characteristics, there are commercial applications in which it is desirable to provide a film combination exhibiting other beneficial properties such as oxygen, flavor/odor, grease/oil and moisture barrier characteristics. The present application provides a cellulose bearing polymeric film structure including oxygen, flavor/odor, grease/oil and moisture barriers. The oxygen barrier includes cross-linked PVOH and the moisture barrier is a cellulose material, preferably box board. The moisture barrier is applied to the outer surface of the oxygen barrier. In addition, the entire film structure also has an excellent flavor/odor, grease/oil barrier.

The polymeric materials contemplated as the substrate of the multilayer structure of the present invention include any polymeric film oriented or unoriented which inherently permits the transmission of oxygen and wherein the utility of such film would call for a minimization of the transmission of oxygen. In most cases, the source of the oxygen referred to herein is atmospheric oxygen. While nylon, polyethylene terephthalate ("PET"), polycarbonate films are contemplated herein, a particularly preferred class of films are the polyolefins. Within the polyolefin class, homopolymers and copolymers of propylene, low density polyethylene ("LDPE") and linear low density polyethylene ("LLDPE") are preferred. High density polyethylene ("HDPE") may also be used. Particularly preferred are isotactic polypropylenes containing at least 80% by weight of isotactic polypropylene. The preferred substrate layer can be homopolymer propylene having a melting point range of from about 321°–336° F. A commercially available material of this description is ARCO W472. The preferred core layer can also be coextruded with a thick skin layer, amounting to from about 2 to about 12% of the total thickness, of a copolymer of propylene and another olefin, e.g., ethylene, butene-1. The other olefin which can be present in the copolymer is in an amount of from about 1–7 wt%.

The polymeric substrate can be of any desired thickness, although thickness will typically range from about 0.5 to about 2 mils to ensure good machinability on high-speed packaging equipment. The OPP film should preferably have a thickness of 1.0 mil.

It has been found advantageous to treat the substrate or base layer prior to receiving the oxygen and moisture barrier layers. Such treatment enhances the adhesion of other coatings.

A preferred treatment involves treating the surface to a surface tension level of at least about 35 and preferably from 38 to 45 dynes/cm in accordance with ASTM Standard D2578-84. The treatment can be flame treatment, plasma treatment, chemical treatment or corona discharge treatment. Flame treatment and corona discharge treatment are preferred with corona discharge treatment being particularly preferred.

After this treatment, a suitable primer material is coated onto the treated surface. Preferred primer materials are those disclosed in U.S. Pat. No. 4,564,559 incorporated herein by reference as if set forth in full herein. These include a primer produced by condensing a monoaldehyde with an interpolymer of acrylamide or methacrylamide and at least one other unsaturated monomer. Further included is a primer material produced by condensing aminoaldehyde with acrylamide or methacrylamide and subsequently interpolymerizing the condensation product with at least one other unsaturated monomer in the presence of a $C_1$–$C_6$ alkanol.

A particularly preferred primer material for the structure contemplated herein has been found to be poly(ethyleneimine). The imine primer provides an overall adhesively active surface for thorough and secure bonding with the subsequently applied cross-linked polyvinyl alcohol. It has been found that an effective coating solution concentration of the poly(ethyleneimine) applied from either aqueous or organic solvent media, such as ethanol, is a solution comprising about 0.1–0.6% by weight of the poly(ethyleneimine). A commercially available material of this type is known as Polymin P, a product of BASF-Wyandotte Corporation.

Another particularly preferred primer material is the reaction product of an epoxy resin as a first component with an acidified aminoethylated vinyl polymer as the second component. The contemplated epoxy resins are glycidyl ethers of polyhydroxy compounds, such as resorcinol, hydroquinone, Novolac® resins, and the like.

Although the specific structure of the epoxy resin is not critical to the primer employed in the present invention, important considerations in the selection of the epoxy resin revolve around its physical state. For example, it must be liquid and capable of being readily dispersed or dissolved with the second component or curing agent as described hereinbelow. If the epoxy resin is of low viscosity, it may be stirred directly into the second component, i.e., curing agent, however, it is preferred to employ the epoxy resin in an aqueous emulsion.

The second component in the epoxy primer composition of the present invention is an amino modified acrylic polymer which is water soluble. This polymer is a curing agent for the epoxy compound. The preferred material is described in U.S. Pat. No. 3,719,629, the disclosure of which is incorporated herein by reference.

In one embodiment of the present invention, a liquid epoxy resin is emulsified in a solution of the curing agent by rapid stirring, the resultant dispersion is diluted with water to the desired concentration for coating, usually from about 2 to about 20% solids. When mixing the epoxy resin with the curing agent, it is generally preferred to use a stoichiometric equivalent balance of epoxy and amine groups. However, it has been found that the stoichiometric ratio may be varied over a wide range, from about 1 epoxy to about 3amine groups through 3 epoxy groups to 1 amine group. Any of the above described primers can be employed in the range of about 0.001 to 3.5 g/m$^2$.

Polyvinyl alcohol ("PVOH") as used in the present invention and claims refers to a normally solid polymeric material, soluble in water, but insoluble in most organic solvents and characterized by the presence of ($-CH_2-CHOH-$) units in the polymer chain. These polymers are ordinarily prepared by the replacement of the acetate groups of polyvinyl acetate with hydroxyl groups as by hydrolysis or alcoholysis. The percent of acetate groups replaced by hydroxyl groups is the degree of hydrolysis PVOH thus formed and indicates the percent of hydroxyl groups present in PVOH out of the total possible hydroxyl groups. As explained hereinbelow the crosslinking reaction by which the superior barrier coatings of this invention are obtained proceeds through the hydroxyl groups of PVOH. Therefore, only substantially completely hydrolyzed PVOH are useful in this invention. By the term "substantially completely hydrolyzed" in the present specification and claims is meant a degree of hydrolysis of above about 85%. We have found that PVOH having an hydroxyl content above 88% and particularly above about 95% provide superior resistance, clarity and flexibility and adhering strength. Hydroxyl group contents of 99% to 100% provide the best barrier coatings and are particularly preferred for use in this invention.

The PVOH employed herein can be any commercially available material. For example, ELVANOL 71-30 or ELVANOL 90-50 are E. I. dupont products.

The PVOH coating solution is prepared by dissolving the polymer in hot water, cooling and mixing both with a suitable crosslinking agent and sulfuric acid as the catalyst. The crosslinking agent can be a melamine- or urea-formaldehyde resin. Commercially available crosslinkers also would include PAREZ 613, a methylated melamine formaldehyde; CYMEL 373, a methylated melamine formaldehyde; CYMEL 401, a trimethylol melamine urea formaldehyde; all obtainable from American Cynamid Corporation and borax. Sulfuric acid as the catalyst has been discovered to be far superior to nitric acid, ammonium chloride and ammonium nitrate.

Crosslinking is carried out to make the PVOH less moisture sensitive but it is essential that this does not substantially occur before the coating weight is applied and evenly distributed. This is effected by making up the aqueous solution so that the initial concentration is too low for this to occur but, as drying occurs, the concentration increases and the rate of crosslinking also increases.

Suitable concentrations have been found to be from 1 to 35 wt.%, preferably from 4 to 8 wt.% of the solution, which are PVOH plus crosslinking agent plus sulfuric acid in a catalytically active amount. If the solids content is higher, the solution becomes too viscous; if lower, good water resistance is not obtained. From about 5% to 30 wt.%, typically 15% crosslinking agent is used with from 0.1% to 7.5%, typically 2 wt.% of the sulfuric acid catalyst. A preferred formulation comprises the following solids content: 85.5 wt.% PVOH; 12.8 wt.% methylated melamine formaldehyde; and 1.7 wt.% sulfuric acid. The sulfuric acid employed can have a strength ranging from about 0.1 to 20 wt.%.

Aqueous PVOH solutions were prepared by dissolving sufficient ELVANOL 71-30 in hot water to form 8 wt.% solution which were then cooled. To these solutions were added a 20 wt.% aqueous melamine formaldehyde solution and the appropriate amount of a solution of aqueous ammonium chloride, sulfuric acid, ammonium sulphate, ammonium nitrate or nitric acid to provide the formulations shown in the Table 1 below. Cross-linked PVOH can be present in from about 0.2 to 3 g/m$^2$.

The cross-linked PVOH coated films described above are intended to be adhered to cellulose materials such as paper, paperboard and fiberboard by adhesion or extrusion lamination. The adhesion or extrusion lamination of the cellulose material is to the outer surface of the crosslinked PVOH layer. The resulting structure is capable of holding liquids and has a high oxygen and flavor/odor, grease/oil barrier. For example, unlaminated box board material has an average oxygen transmission rate ("TO$_2$") in excess of 150 cc/100 in$^2$/24 hr at 75° F. and 0% relative humidity ("RH"). When cross-linked PVOH coated film was laminated to box board material the TO$_2$ rate was significantly lower, namely 0.020 cc/100 in$^2$/24 hr at 75° F. and 0% RH and 0.10 cc/100 in$^2$/24 hr at 75° F. and 75% RH.

The lamination to box board material is accomplished by using an adhesive such as polyurethane, acrylics or PVdC's. The resulting structure is then extrusion coated preferably with a sealant layer of SURLYN® (ethylene Methacrylic acidionomers or polyethylene to prevent leaching of any cellulose component into the liquid which comes in contact with the sealant layer and to enhance the moisture barrier of the resulting film structure. Containers formed from the packaging film structure of the present invention can be used to package milk, orange juice and wine.

It has also been found that by using a cross-linked PVOH film combination laminated to box board an excellent oxygen barrier is provided which requires considerably less coating of cross-linked PVOH than a comparable EVOH film. For example, a 48 gauge layer of EVOH film provides an oxygen barrier of 0.04 cc/100 in$^2$/24 hr. at 75° F., 0% RH and WVTR of 100 gm/100 in$^2$/24 hr at 100° F., 90% RH. The EVOH has no moisture barrier. The same oxygen barrier value and a WVTR value of 0.35 g/100 in$^2$/24 hr at 100° F., 90% RH are obtained when a substrate of 79 gauge OPP is covered with only a 3 gauge layer of cross-linked PVOH. Thus, significant cost savings can be realized as a result of using a much thinner coating of PVOH.

Cellulose materials useful in the present invention are generally paper products such as paper, paperboard and fiberboard. Although there is no strict distinction between paper and paperboard, paper is considered to be a product made from cellulose fibers which is less than 0.012 inch thick. Paper used in packaging may be course and fine. Course packaging paper is known as kraft paper and is almost always made of unbleached kraft soft wood pulps. Fine papers, generally made of bleached pulp, are typically used in applications requiring printing, writing, and special functional properties such as barriers to liquid and/or gaseous penetrants. Other types of paper useful in the present invention are parchment, grease proof, glassine, water, grease and oil resistant, waxed, specialty-treated, wet-strength papers, all as defined in M. Bakker, "The Wiley Encyclopedia of Packaging Technology," p. 497–500, 1986, incorporated herein by reference.

A preferred cellulose fiber material useful in the present invention is paperboard. Paperboard is a relatively stiff paper product usually greater than 12 mils. The term paperboard is used to distinguish the product from paper which is thin and quite flexible. Paperboard may have single-ply or multi-ply structure. It can be formed on a Fourdrinier wire part, a single or a series of modern formers.

The single-ply paperboard useful for this invention is made from 100% bleached-chemical wood pulp and can be used for food packaging where purity and clean appearance is required together with a degree of strength and a surface of sufficient quality to accept good-quality print. Compared to single-ply structures, multi-ply paperboard can be used over a much wider range of applications because virgin-pulp outer layers with good appearance, strength,-and printing properties can be combined with lower-grade middle plies. The general term for this range of paperboard is folding box board.

Another type of paperboard known as fiberboard, used to produce large and strong cases is also useful in the present invention. The materials used for the construction of these containers are made from several layers of paperboard. There are two main types: solid board wherein two or more boards are laminated together and corrugated board. In the production of corrugated board, two facings are glued to both sides of the corrugating medium to produce a single-wall corrugated board. Three facings and two media are used to obtain double-wall corrugated board. Triple-wall corrugated board uses four facings and three media. In the structures of the present invention single or multi-ply paperboard hard-sized for water resistance according to known techniques in the art is preferred. Types of paperboard and fiberboard are as defined in M. Bakker, "The Wiley Encyclopedia of Packaging Technology," p. 500–506, 1986, incorporated herein by reference.

The cross-linked PVOH/cellulose material structure of the present invention has excellent oxygen and flavor/odor, grease/oil barrier characteristics and is capable of holding liquids. Depending upon the application, it is possible to employ the film structure of the present invention to hold liquids, other foodstuffs or detergent materials next to the sealant coated cellulose material layer as illustrated in FIG. 1 or next to the sealant coated polymeric substrate as illustrated in FIG. 2.

FIG. 1 shows a schematic cross-section of a film structure prepared according to the present invention. Layer 10 represents a surface treated polymeric substrate which is coated with a primer layer 11 on at least one surface to which a cross-linked PVOH layer 12 is adhered. The cross-linked PVOH layer may be printed and then adhered to a cellulose material layer 14 by using an adhesive coating 13. Optionally, instead of printing the cross-linked PVOH layer, the cellulose material may be printed and then adhered to a cross-linked PVOH film structure. When the cellulose material is next to a liquid, in order to prevent leaching of any cellulose component into the liquid, the resulting structure is extrusion coated with a sealant 15 such as SURLYN® (ethylene Methacrylic acidionomers or polyethylene on the outer surface of the cellulose material. The resulting film structure also has enhanced moisture barrier characteristics.

Figure 2:
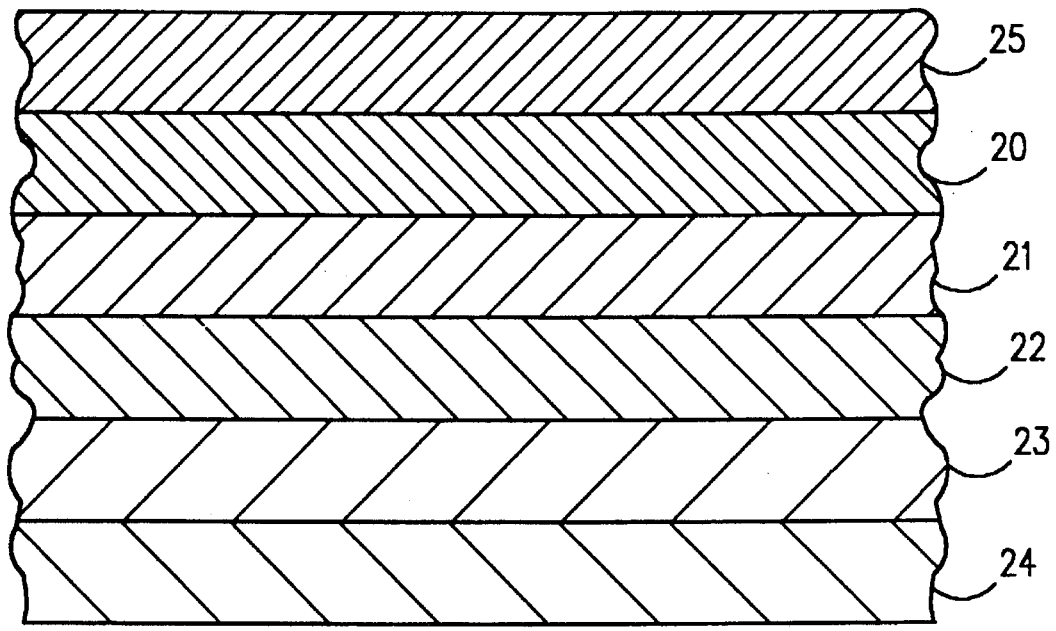
FIG. 2 shows a cross-sectional view of another embodiment of the present invention, wherein the foodstuff is next to the sealant coated polymeric substrate.

FIG. 2 illustrates another embodiment of the present invention, wherein layer 20 represents a polymeric substrate surface treated on at least one side, primed with a primer coating 21 surface treated and thus adapted to receive a cross-linked PVOH layer 22 which can then be adhered to a cellulose material 24 by using an adhesive coating 23. The cellulose material may be printed. When the polymeric substrate is on the inside, then the cellulose containing resulting film structure is extrusion coated with a sealant 25, such as SURLYN® or polyethylene on the outer surface of the polymeric substrate to provide an enhanced moisture barrier.

EXAMPLES

The following examples serve to provide further appreciation of the invention but are not meant in any way to restrict the effective scope of the invention.

EXAMPLE 1

A homopolymer polypropylene core layer is coextruded with skin layers of an ethylene-propylene random copolymer. The random copolymer contains approximately 3–5% by weight of ethylene. The extruded film is biaxially oriented to 4–5 times machine direction and 7–10 times transverse direction to yield a film having a thickness of approximately 1 mil. The thickness of the skin layers is approximately 8% of the film and are approximately of equal thickness. This film combination is corona discharge treated in accordance with commonly employed prior art techniques to produce a surface with a wetting tension of about 42 dynes/cm. The treated film is precoated on both sides with 0.1 wt.% poly(ethyleneimine), as manufactured by BASF-Wyandotte Corporation Polyamin P product. The film is air-dried at 100° C. This coating weight is too low to be measured, but is calculated to be in the range of $0.002/m^2$ by means of optical density. One treated and primed surface of this film structure was then coated with the appropriate solution of PVOH, cross-linking agent and catalyst. The solutions were applied utilizing a reverse direct gravure coater and the coated film is passed through a dry-air oven at from 100–125° C. This produces a coating weight of 0.5 $g/m^2$.

The dried films are then tested in an oxygen-permeability device in which a stream of dry oxygen is passed through an aqueous salt solution-permeated pad to control the gas moisture content and then through the films, disposed at right angles to the stream with the cross-linked PVOH coating upstream. The oxygen transmitted was determined and the amount of oxygen passed per unit area of film per time period was calculated.

Samples bearing cross-linked PVOH layer obtained by using sulfuric acid catalyzed systems were superior to any other catalyzed system for inhibiting the transmission of oxygen through a packaging films. The rubbing resistance of the sulfuric acid catalyzed film combinations was also outstanding. Oxygen transmission and rubbing resistance rates for several samples bearing PVOH cross-linked in the presence of methylated melamine formaldehyde, ammonium chloride and sulfuric acid are set forth in Table 1 below.

TABLE 1

| SAMPLE CODE | CATALYST (PHR) | P 613[1] XLINK (PHR) | RUBBING[2] RESISTANCE 0 WK | 1 WK | 3 WK | TO$_2$ (CC/100IN$^2$/24 HR)[3] AT 75% RH 1 WK | 3 WK | APP. 50% RH |
|---|---|---|---|---|---|---|---|---|
| 1 | NH$_4$Cl:2.0 | 15 | 100 | 70 | 50 | 7.07 | 11.00 | |
| 2 | NH$_4$Cl:2.0 | 15 | 100 | 70 | 50 | 9.94 | — | |
| 3 | NH$_4$Cl:2.5 | 20 | 70 | 70 | 70 | 8.63 | — | |
| 4 | (NH$_4$)$_2$SO$_4$:1.5 | 10 | — | — | 100 | — | 8.20 | |
| 5 | (NH$_4$)$_2$SO$_4$:3.0 | 25 | — | — | 100 | — | 5.80 | |
| 6 | NH$_4$NO$_3$:1.5 | 10 | — | — | 0 | — | 5.60 | |
| 7 | HNO$_3$:1.5 | 10 | — | — | 70 | — | 9.00 | |
| 8 | Nil | Nil | 100 | 100 | 100 | 4.64 | 7.03 | |
| 9 | H$_2$SO$_4$:2.0 | 15 | 50 | 30 | 0 | 4.19 | 3.53 | |
| 10 | H$_2$SO$_4$:2.0 | 25 | 50 | 50 | 0 | 4.69 | 3.86 | |
| 11 | H$_2$SO$_4$:2.0 | 20 | 50 | 30 | 0 | 3.14 | 3.24 | |
| 12 | H$_2$SO$_4$:3.0 | 20 | 10 | 0 | 0 | 1.69 | 2.78 | |
| 13 | H$_2$SO$_4$:3.0 | 25 | — | — | 0 | | 3.10 | |

[1]Parez 613, a methylated melamine formaldehyde.
[2]% of coating removed.
[3]Oxygen transmission rate.

Table 1 illustrates that samples bearing PVOH crosslinked with sulfuric acid have oxygen transmission rate and rubbing resistance values for superior to those cross-linked with ammonium chloride.

EXAMPLE 2

A cross-linked PVOH coating was applied to a 1.00 mil OPP film, surface treated and primed as in Example 1 above. The resulting film combination was laminated on the cross-linked PVOH bearing surface with a box board by using a polyurethane adhesive coated onto the box board.

The above procedure protects the cross-linked PVOH coating and prevents liquids such as tomato sauce, milk, wines, juices and the like from leaching any components from the coating. The resulting film is then extrusion coated with a sealant layer of SURLYN® or polyethylene. Table 2 below summarizes the oxygen and moisture barrier properties of the film structure obtained in this example. The WVTR values obtained for the films set forth in Table 2 have been measured as described in ASTM F-372. Comparative TO$_2$ and WVTR results to EVOH are also included.

EVOH to provide a structure with comparable oxygen and moisture barrier properties. As a result, by using the box board film structure of the present invention significant cost reductions are obtained.

Thus, while there have been described what are presently believed to be the preferred embodiments of the present invention, those skilled in the art will realize that other and further modifications can be made without departing from the true spirit of the invention and it is intended to include all such modifications and variations as come within the scope of the claims as set forth below.

We claim:

1. A cellulose containing packaging film structure which comprises:

I. a polymeric substrate having at least one treated surface, said treated surface having a primer layer thereon;

II. an oxygen and enhanced moisture barrier water-soluble coating onto said primed treated surface of said polymeric substrate, said coating comprising polyvinyl alcohol cross-linked with an aldehyde containing cross-linking agent in the presence of a catalytic amount of sulfuric acid on said one primed surface of said polymeric substrate;

III. a cellulose material laminated to an outer surface of said oxygen and enhanced moisture barrier coating whereby said cellulose containing polymeric film structure has enhanced oxygen, flavor/odor, grease/oil and moisture barrier properties.

TABLE 2

| SUBSTRATE | SUBSTRATE[1] THICKNESS | BARRIER LAYER | THICKNESS[1] OF BARRIER LAYER | TO$_2$[2] | TO$_2$[3] | WVTR[4] |
|---|---|---|---|---|---|---|
| Unlaminated Box Board | 12 | — | — | 150 | 150 | 100 |
| Coated OPP | 1 mil | Cross-Linked PVOH | 0.03 | 0.03 | 3.1 | 0.36 |
| Coated OPP | 0.79 | Cross-Linked PVOH and Box Board | 0.03 | 0.04 | 1.6 | 0.40 |
| Oriented EVOH | 0.48 | — | 0.48 | 0.04 | 12.4 | 100 |

[1]Thickness is measured in mil.
[2]Average Oxygen Transmission Rate measured in cc/100 in$^2$/24 hr at 75° F., 0% RH.
[3]Average Oxygen Transmission Rate measured in cc/100 in$^2$/24 hr at 75° F., 75% RH.
[4]Water Vapor Transmission Rate measured in gm/100 in$^2$/24 hr at 100° F., 90% RH.

In Table 2, plain box board material shows poor oxygen barrier characteristics. After the box board material is laminated onto the outer face of a cross-linked PVOH bearing OPP substrate the oxygen transmission rate decreases substantially. In addition, Table 2 also indicates that in the film structure of the present invention, a much thinner coating of cross-linked PVOH film combination is required than 2. The film structure of claim 1, wherein said cellulose material is selected from the group consisting of paper, paperboard and fiberboard.

3. The film structure of claim 1, further comprising an adhesive coated between said oxygen barrier and cellulose material.

4. The film structure of claim 3, wherein said adhesive is selected from the group consisting of polyurethane and polyethylene.

5. The film structure of claim 1, wherein said polymeric substrate is selected from the group consisting of oriented polypropylene, polyethylene, polyethylene terephthalate, nylon and cast polyolefins.

6. The film structure of claim 1, wherein said aldehyde containing cross-linking agent is selected from the group consisting of urea formaldehyde, melamine formaldehyde, methylated melamine formaldehyde and trimethylol melamine urea formaldehyde.

7. The film structure of claim 1, wherein said oxygen barrier includes from about 70 to about 98 by weight of said polyvinyl alcohol, and from about 1 to about 30 by weight of said cross-linking agent.

8. The film structure of claim 1, wherein said oxygen barrier layer includes from about 0.1 to about 5.0 by weight of said cross-linking agent.

9. The film structure of claim 1, wherein said polymeric substrate further comprises a coextruded propylene-ethylene copolymer skin layer on at least one surface thereof.

10. The film structure of claim 1, wherein said primer layer is selected from the group consisting of a primer produced by condensing a monoaldehyde with an interpolymer of acrylamide or methacrylamide and at least one other unsaturated monomer; a primer produced by condensing aminoaldehyde with acrylamide or methacrylamide and interpolymerizing the condensation product with another unsaturated monomer in the presence of a $C_1$–$C_6$ alkanol; poly(ethyleneimine); and the reaction product of an epoxy resin and an acidified aminoethylated vinyl polymer.

11. The film structure of claim 1, wherein said polymeric substrate further comprises a heat seal layer on an outer surface of said polymeric substrate.

12. The film structure of claim 11, wherein said heat seal layer is selected from the group consisting of ethylene Methacrylic acidionomers and polyethylene.

13. The film structure of claim 1, wherein said cellulose material further comprises a heat seal layer on an outer surface of said cellulose material.

14. The film structure of claim 13, wherein said heat seal layer is selected from the group consisting of ethylene Methacrylic acidionomers and polyethylene.

15. A cellulose containing packaging film structure having improved oxygen, flavor/odor, grease/oil, and moisture barrier characteristics, produced by the following steps:

(i) coating one surface of a surface treated and primed polymeric substrate adapted to receive an oxygen barrier coating with an aqueous solution of polyvinyl alcohol, an aldehyde-containing cross-linking agent and a catalytic amount of sulfuric acid;

(ii) cross-linking said polyvinyl alcohol to provide said oxygen, flavor/odor, grease/oil and moisture barrier; and (iii) adhering or extrusion laminating a cellulose material moisture barrier to an outer surface of said oxygen and moisture barrier coating obtained in step (ii).

16. The film structure of claim 15, wherein said aqueous solution includes a solid content comprising from about 62.5% to about 95% by weight of said polyvinyl alcohol, from about 5% to about 30% by weight of said cross-linking agent and up to about 7.5% by weight of said acid catalyst.

17. The film structure of claim 15, wherein said polymeric substrate has been treated to a surface free energy of at least 35 dynes/cm.

18. The cellulose containing packaging film structure of claim 1, wherein said film structure has an oxygen transmission rate of from about 0.02 cc/100 in$^2$/24 hr. at 75° F. and 0% relative humidity to about 1.6 cc/100 in$^2$/24 hr. at 75° F. and 75% relative humidity.

19. A cellulose containing packaging film structure which comprises:

I. a polymeric substrate having at least one treated surface, said treated surface having a primer layer thereon;

II. an oxygen and enhanced moisture barrier coating onto said primed treated surface of said polymeric substrate, said coating comprising polyvinyl alcohol cross-linked with an aldehyde containing cross-linking agent in the presence of a catalytic amount of sulfuric acid on said one primed surface of said polymeric substrate;

III. a cellulose material laminated to an outer surface of said oxygen and enhanced moisture barrier coating whereby said cellulose containing polymeric film structure has enhanced oxygen, flavor/odor, grease/oil and moisture barrier properties;

IV. an adhesive coating between said oxygen barrier and said cellulose material; and V. a heat seal layer on an outer surface of said polymeric substrate.

20. A cellulose containing packaging film structure which comprises:

I. a polymeric substrate having at least one treated surface, said treated surface having a primer layer thereon;

II. an oxygen and enhanced moisture barrier water-soluble coating onto said primed treated surface of said polymeric substrate, said coating comprising polyvinyl alcohol cross-linked with an aldehyde containing cross-linking agent in the presence of a catalytic amount of sulfuric acid on said one primed surface of said polymeric substrate;

III. a cellulose material laminated to an outer surface of said oxygen and enhanced moisture barrier coating whereby said cellulose containing polymeric film structure has enhanced oxygen, flavor/odor, grease/oil and moisture barrier properties, wherein said primer is selected from the group consisting of a primer produced by condensing a monoaldehyde with an interpolymer of acrylamide or methacrylamide and at least one other unsaturated monomer; a primer produced by condensing aminoaldehyde with acrylamide or methacrylamide and interpolymerizing the condensation product with another unsaturated monomer in the presence of a $C_1$–$C_6$ alkanol; poly(ethyleneimine); and the reaction product of an epoxy resin and an acidified aminoethylated vinyl polymer.

\* \* \* \* \*